Aug. 25, 1925.
T. F. JOHNSON, JR
1,551,252
GROUNDING STICK
Filed May 20, 1922
2 Sheets-Sheet 2
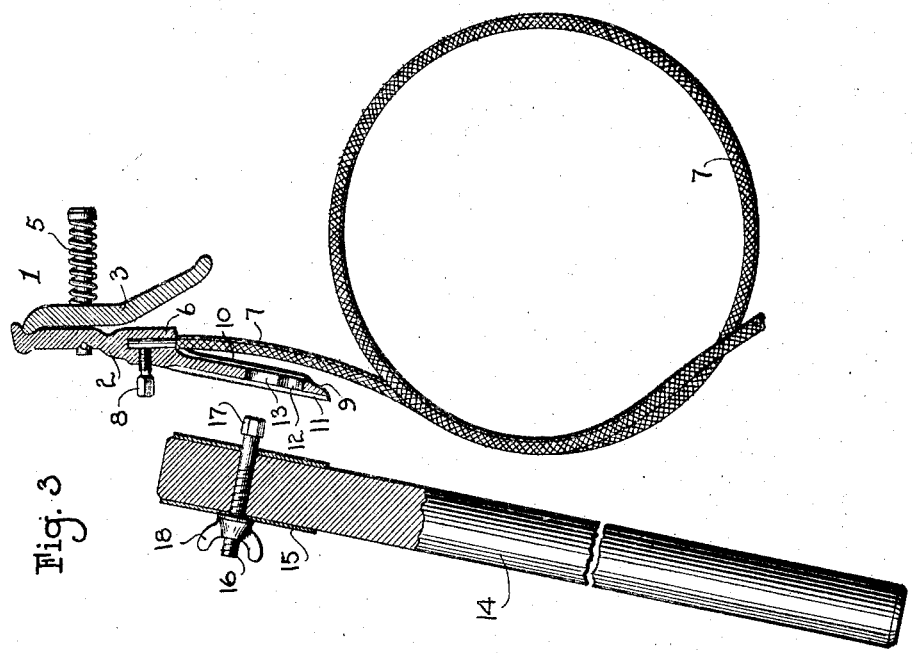
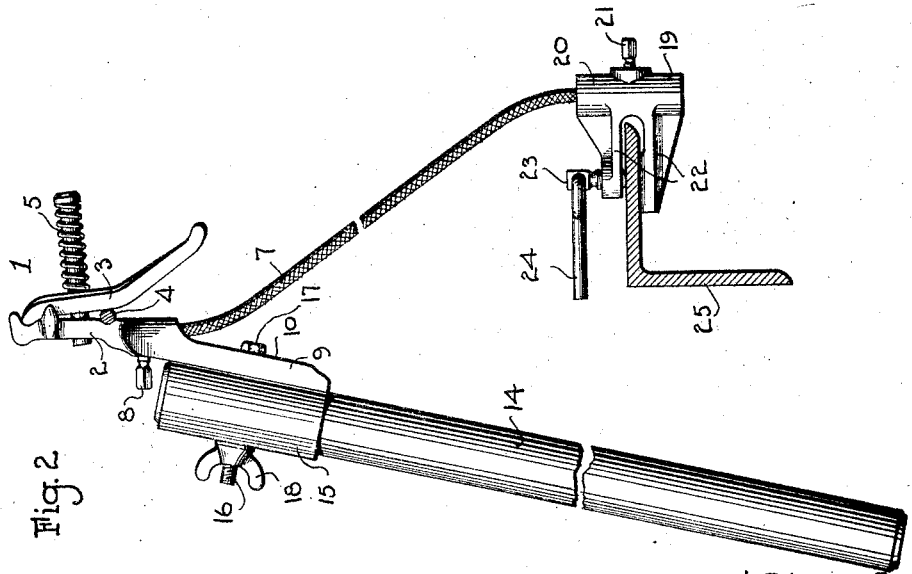
Tomlinson F. Johnson, Jr.
INVENTOR
WITNESSES
BY
ATTORNEY Patented Aug. 25, 1925.

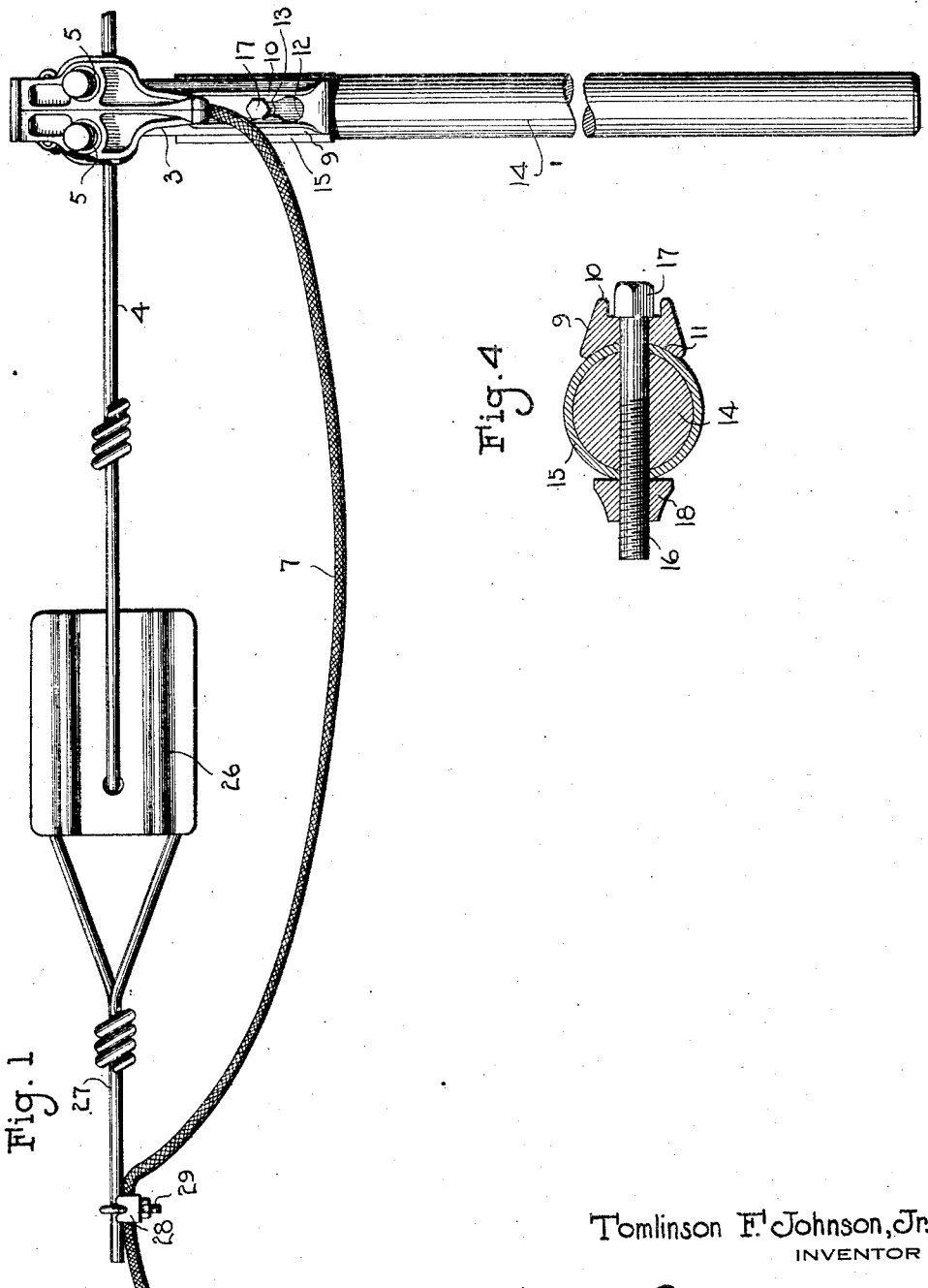

1,551,252

UNITED STATES PATENT OFFICE.

TOMLINSON FORT JOHNSON, JR., OF ATLANTA, GEORGIA.

GROUNDING STICK.

Application filed May 20, 1922. Serial No. 562,381.

*To all whom it may concern:*

Be it known that I, TOMLINSON F. JOHNSON, Jr., a citizen of the United States, residing at Atlanta, in the county of Fulton and State of Georgia, have invented a new and useful Grounding Stick, of which the following is a specification.

This invention relates to grounding sticks for use in connection with line wires or electrical conductors, especially those carrying high voltage.

In carrying out the invention, I provide a pole or stick having non-conducting qualities and capable of being readily attached to or detached from a clamp which has spring jaws for automatically snapping over the wire or conductor when the same is elevated by the pole, the said clamp having permanently secured thereto one end of a lead wire or extension, which may be used for short-circuiting or grounding the current, as in the case of repairs or for other maintenance purposes, the other end of the lead having permanently secured thereto a device for detachable connection with a part of the supporting tower.

The grounding pole or stick is particularly designed for use in connection with the clamp which is shown and described in my pending application Serial No. 262,366, filed Nov. 13, 1918, which has since eventuated in Patent No. 1,500,498, the said clamp being modified to embody means whereby the pole may be rigidly held to the same, or detached therefrom, means being provided therein for connection with the said lead or extension.

A full and complete understanding of the invention may be obtained from a consideration of the following detailed description, taken in connection with the accompanying drawings, forming a part of this specification, it being understood that while the drawings show a practical form of the invention, the latter is not confined to strict conformity therewith, but may be changed or modified, so long as such changes or modifications mark no material departure from the salient features of the invention, as specifically pointed out in the appended claims.

In the drawings, in which similar reference characters designate corresponding parts throughout the several figures:—

Fig. 1 is a front elevation of the device attached to a line wire when used as a disconnecting switch for in-doors.

Fig. 2 is a side elevation of the device attached to a line wire and having its lead or extension attached to a portion of a supporting tower to ground the current therethrough.

Fig. 3 is a sectional view showing the clamp and lead or extension detached from the pole or stick.

Fig. 4 is a cross sectional detail of the pole or stick and the means for detachably connecting the same to the clamp.

In my prior Patent, 1,244,339, I disclosed a spring clamp for electrical conductors similar in function to that disclosed in my aforesaid application, the said clamp employing a stick by means of which it could be hooked onto the wire and the stick removed, the clamp being left on the wire, the stick being then used in handling other clamps. It requires considerable skill to use the stick with the clamp shown in the aforesaid patent, and the special object of the present invention is to devise a stick which may be used by unskilled men.

In this instance, the stick is rigidly bolted to the spring clamp, and serves as a permanent handle therefor. It is much more convenient for grounding lines than any other arrangement. Sometimes the lead wire from the spring clamp to the grounding clamp is eight or ten feet long, which in connection with the size of the stick varying in length from six to ten feet would make a very inconvenient bundle, if carried together. I have, therefore, devised a connection between the spring clamp and the pole or stick which, though rigid, is capable of being detached for transportation purposes.

Referring to the drawings, there is illustrated in Fig. 1 a clamp indicated generally by the numeral 1, and comprising a pair of coacting, spring actuated jaws 2 and 3 respectively, having their lower portions flaring apart or away from each other, and provided with seats for a line wire 4, which may be readily forced thereinto by a downward movement of the clamp, while the jaws are in straddling relation to the said wire, a pair of coiled springs 5 being employed to exert a constant pressure inwardly on the jaws to cause such clamping action, as will be readily understood. As no specific claim is made herein to the construction of the clamping jaws proper, it is deemed unnecessary to further explain the same.

The lower flaring end of the jaw 2 is provided with a vertically disposed socket 6, into which is secured the bared end of a lead or extension 7, the insulation on said end being removed and the same soldered into the socket, and further held in permanent connection by means of a set screw 8 passing through the outer wall of the socket 6 and impinging the end of the lead.

The end of the jaw 2 is extended below the open end of the socket, and at the outer side thereof, to form an attaching arm 9 provided on its inner face with strengthening ribs 10 arranged along the vertical margins of the same, and the opposite or outer face of the arm 9 is concaved, as indicated at 11 in Fig. 3 of the drawing. Adjacent to the lower end of the arm 9, and between the marginal ribs or flanges 10, is a circular passageway 12 having an upwardly-extending slot 13 communicating therewith, forming in effect a key-hole slot, and adapted, together with the concave face 11, to facilitate the connection of the clamp, to the grounding stick or pole, as will be explained.

A pole 14 formed of suitable wood of a diameter to be easily handled and preferably of from three to twelve feet in length, is adapted to be secured to the above described clamp in a manner to permit of its ready removal when desired and the quick re-application of the same. To this end, one end of the pole is provided with a metallic ferrule 15 tightly fitting the same, and of a diameter conforming with the curvature of the concave face 11 of the extension of the clamp, a bolt 16 passing transversely through appropriate alined openings in the ferrule 15 and the confined end of the pole, and being adapted to secure the clamp to the end of the pole, by engaging the head 17 of the bolt in the contracted slot 13 of the arm, after the said head has been introduced through the opening 12, and then tightening up a thumb nut 18 at the opposite, threaded end of the bolt. It will be seen that by a single turn or two of the nut 18, the head of the bolt may be freed from its engagement with the arm 9 of the clamp, and the latter entirely removed therefrom when desired, and the lead wire coiled for storage or transportation, as illustrated in Fig. 3 of the drawing.

The lead or extension wire 7 is provided at its free end with a grounding clamp 19, consisting of a tubular socket member 20 having a set screw 21 for binding the wire therein, after the same has been soldered in the manner of the first described joint, and the clamp 19 is further provided with spaced arms 22, arranged one above the other, the upper arm being provided with a set screw 23 having a swiveled turning arm 24 which is adapted to bind the clamp 19 to one flange of an angle iron member 25, which usually forms the structure of supporting towers for line wires of this class, as shown in Fig. 2. When the parts are applied in the manner described, the current may be grounded from the line wire into and through the tower structure, as will be readily understood, and it will also be seen that the pole may be easily and safely detached from the clamp by previously unscrewing the thumb-nut 18 while repair work may progress at any point within the safety zone.

Another use for the device is shown in Fig. 1 of the drawing, wherein the lead wire 7 is shown in bridging relation to a terminal insulator 26 of ordinary construction to which is attached the end of the line wire 4 and having connection with a stay wire 27 in the usual manner, the free end of the lead wire 7 being made fast to the stay wire 27 by an ordinary clamp or clip 28 provided with a nut and U-bolt 29 for tightening the same in position.

This arrangement and application of the device makes a very convenient and economical indoor disconnecting switch, and since the terminal of the line wire is usually indoors, the stick or pole may be left permanently attached to the clamp.

From the foregoing, it will be seen that a simple, cheaply manufactured and easily manipulated device for the purpose has been provided, which may be used in various places and for various purposes for safeguarding linemen in the maintenance of line wires of heavy voltage.

What is claimed is:—

1. In a device of the class described, the combination with a clamp composed of a pair of spring-pressed jaws for engagement with a line conductor, one of said jaws being provided with a socket at its inner side to receive the end of a lead, and a rigid straight arm extending from said jaw below the socket, a pole, and means whereby the latter may be connected rigidly but detachably to that face of the arm away from the said lead.

2. In a device of the class described, the combination with a clamp, composed of spring-pressed jaws for engagement with a line conductor, of an arm on one of the jaws provided with a keyhole slot, and a pole carrying a headed bolt to engage with said slot.

3. In a device of the class described, the combination with a clamp composed of a pair of spring-pressed jaws for engagement with a line conductor, said jaws having their lower portions flaring apart, one of said jaws being provided with a socket at its inner side to receive the end of a lead, said jaws being extended downwardly beyond said socket to form an attaching arm, a pole, and means whereby the pole may be rigidly connected to that face of said arm away from said lead.

4. In a device of the class described, the combination with a pole provided with a headed bolt, and a nut at one end of the bolt, of a clamp provided with a keyhole slot to receive the head of said bolt and provide for the rigid though detachable connection between the pole and said clamp.

5. In a device of the class described, the combination with a clamp composed of a pair of spring-pressed jaws to engage a line conductor, one of said jaws being provided on its inner side with a socket, and the other jaw having its lower portion flaring outwardly, a lead in said socket, a depending arm on the jaw having the socket, a pole, said arm and said pole having coacting means whereby the pole may be secured to the arm for manipulating the clamp but may be detached at will.

In testimony that I claim the foregoing as my own I have hereto affixed my signature.

TOMLINSON FORT JOHNSON, Jr.